US012133304B2

(12) United States Patent
Uchida et al.

(10) Patent No.: US 12,133,304 B2
(45) Date of Patent: Oct. 29, 2024

(54) LIGHT EMITTING MODULE, AND LIGHTING DEVICE

(71) Applicant: KOTO ELECTRIC CO., LTD., Tokyo (JP)

(72) Inventors: Daisuke Uchida, Tokyo (JP); Hiroyuki Oka, Tokyo (JP)

(73) Assignee: KOTO ELECTRIC CO., LTD. (JP)

(*) Notice: Subject to any disclaimer, the term of this patent is extended or adjusted under 35 U.S.C. 154(b) by 0 days.

(21) Appl. No.: 18/552,744

(22) PCT Filed: Jul. 30, 2021

(86) PCT No.: PCT/JP2021/028507
§ 371 (c)(1),
(2) Date: Oct. 31, 2023

(87) PCT Pub. No.: WO2022/208922
PCT Pub. Date: Oct. 6, 2022

(65) Prior Publication Data

US 2024/0155750 A1 May 9, 2024

(30) Foreign Application Priority Data

Mar. 29, 2021 (JP) ................................ 2021-055101

(51) Int. Cl.
*H05B 45/28* (2020.01)
*F21K 9/65* (2016.01)
(Continued)

(52) U.S. Cl.
CPC ............... *H05B 45/28* (2020.01); *F21K 9/65* (2016.08); *F21K 9/68* (2016.08); *H05B 45/10* (2020.01);
(Continued)

(58) Field of Classification Search
CPC H05B 45/28; H05B 45/10; F21K 9/65; F21K 9/68; F21Y 2105/12
(Continued)

(56) References Cited

U.S. PATENT DOCUMENTS

2010/0002428 A1* 1/2010 Hall ....................... A61B 90/36
362/231
2020/0100341 A1* 3/2020 Janik ...................... H05B 45/20
2023/0209673 A1* 6/2023 Harte ..................... H05B 45/20
362/249.02

FOREIGN PATENT DOCUMENTS

JP 2019114794 A 7/2019
JP 2020119723 A 8/2020

OTHER PUBLICATIONS

International Search Report and Written Opinion of the International Searching Authority for International Application No. PCT/JP2021/028507, mailed Aug. 31, 2021. (translation included).

* cited by examiner

*Primary Examiner* — Laura K Tso
(74) *Attorney, Agent, or Firm* — MASCHOFF BRENNAN

(57) ABSTRACT

A light emitting module includes 7 colors (2700K 5700K, violet, blue, cyan, lime, and red) of LEDs. With the light emitting module, by causing each of the 7 colors of LEDs to emit at a predetermined intensity, it is possible to emit high color rendering mixed light that has a correlated color temperature from 5000 to 6500K corresponding to the color temperature of daylight, and that can achieve an average color rendering index Ra and a special color rendering index R9 of 98 or greater (99), and a special color rendering index R12 of 94 or greater.

19 Claims, 10 Drawing Sheets

(51) Int. Cl.
*F21K 9/68* (2016.01)
*F21Y 105/12* (2016.01)
*F21Y 115/10* (2016.01)
*H05B 45/10* (2020.01)

(52) U.S. Cl.
CPC ....... *F21Y 2105/12* (2016.08); *F21Y 2115/10* (2016.08)

(58) Field of Classification Search
USPC .......................................................... 362/231
See application file for complete search history.

FIG. 2

EXAMPLE OF LEDs 21-27

| LED | COLOR, COLOR TEMPERATURE | PEAK WAVELENGTH $\lambda p$ | DOMINANT WAVELENGTH $\lambda d$ | COLOR COORDINATES (MEDIANS) | OTHER |
|---|---|---|---|---|---|
| 21 | 2700K | | | (0.4578,0.4101) | Ra>90 R9>80 |
| 22 | 5700K | | | (0.3287,0.3417) | Ra>90 R9>50 |
| 23 | VIOLET(VLT) | 420~430nm | | | |
| 24 | BLUE(BLU) | | 475~480nm | | |
| 25 | CYAN(CYN) | | 496~500nm | | |
| 26 | LIME(LME) | | | (0.4140,0.5430) | |
| 27 | RED(RED) | | 624~634nm | | |

FIG. 5

DUTY RATIO RANGE from 0/128 to 128/128

MINIMUM PULSE WIDTH 1/128 ≅ 1.95 μs

| STEP | DUTY RATIO OF ONE PULSE (n/128) | | | | | | | | PULSE WIDTH TOTAL (μs) | |
|---|---|---|---|---|---|---|---|---|---|---|
| 1023 | 128 | 128 | 128 | 128 | 128 | 128 | 128 | 127 | 1994.85 | |
| 1022 | 128 | 128 | 128 | 127 | 128 | 128 | 128 | 127 | 1992.90 | |
| 1021 | 128 | 127 | 128 | 127 | 128 | 128 | 127 | 128 | 1990.95 | |
| 1020 | 128 | 127 | 128 | 127 | 128 | 127 | 128 | 127 | 1989.00 | |
| ⋮ | | | | | | | | | | |
| 10 | 2 | 1 | 1 | 1 | 2 | 1 | 1 | 1 | 19.50 | |
| 9 | 2 | 1 | 1 | 1 | 1 | 1 | 1 | 1 | 17.55 | |
| 8 | 1 | 1 | 1 | 1 | 1 | 1 | 1 | 1 | 15.60 | 4KHz |
| 7 | 1 | 1 | 1 | 1 | 1 | 1 | 1 | 0 | 13.65 | |
| 6 | 1 | 1 | 1 | 0 | 1 | 1 | 1 | 0 | 11.70 | |
| 5 | 1 | 0 | 1 | 0 | 1 | 1 | 0 | 1 | 9.75 | |
| 4 | 1 | 0 | 1 | 0 | 1 | 0 | 1 | 0 | 7.80 | 2KHz |
| 3 | 1 | 0 | 1 | 0 | 0 | 1 | 0 | 0 | 5.85 | |
| 2 | 1 | 0 | 0 | 0 | 1 | 0 | 0 | 0 | 3.90 | 1KHz |
| 1 | 1 | 0 | 0 | 0 | 0 | 0 | 0 | 0 | 1.95 | 500Hz |
| 0 | 0 | 0 | 0 | 0 | 0 | 0 | 0 | 0 | 0 | 0Hz |

FM MODULATION (steps 0 to 8)

PWM MODULATION (steps 0 to 1023)

2000 μs(500Hz)

FIG. 6

* EMPTY CELL = NOT LIT

| CORRELATED COLOR TEMPERATURE | | 2000K | 2500K | 2700K | 3000K | 3500K | 4000K | 5000K | 5500K | 6500K | 8000K | 10000K | 20000K |
|---|---|---|---|---|---|---|---|---|---|---|---|---|---|
| LUMINOUS FLUX | 2700K(Lm)<br>(LED21) | 3000 | 21000 | 24000 | 22000 | 20000 | 19000 | 14800 | 11000 | 6000 | 3100 | 2200 | |
| | 5700K(Lm)<br>(LED22) | | | | | 4600 | 11400 | 14700 | 16900 | 18000 | 15000 | 15000 | 15000 |
| | VLT(W)<br>(Lm)<br>(LED23) | | | | 0.55<br>4.6 | 1.3<br>10.9 | 2.3<br>19.3 | 10.5<br>88.0 | 11<br>92.0 | 12<br>100.6 | 13.3<br>111.5 | 19<br>159.2 | 27<br>226.3 |
| | BLU(Lm)<br>(LED24) | | | | 220 | 330 | 530 | 1050 | 1350 | 1500 | 1500 | 1500 | 1500 |
| | CYN(Lm)<br>(LED25) | | | | 110 | 530 | 760 | 1740 | 1930 | 1300 | 1000 | 1800 | 2200 |
| | LME(Lm)<br>(LED26) | 3000 | 3700 | | 2750 | 4000 | 5300 | 9590 | 11000 | 8000 | 6600 | 6600 | 5200 |
| | RED(Lm)<br>(LED27) | 1900 | 1900 | | | | | 87 | 230 | | | | |
| TOTAL LUMINOUS FLUX (Lm) | | 7900 | 26600 | 24000 | 25085 | 29471 | 37009 | 42055 | 42502 | 34901 | 27311 | 27259 | 24126 |
| POWER CONSUMPTION (W) | | 87.7 | 310.6 | 292.1 | 292.7 | 331.8 | 405.5 | 459.6 | 458.9 | 385.5 | 311.0 | 323.4 | 310.6 |
| EMISSION EFFICIENCY (Lm/W) | | 90.1 | 85.6 | 82.2 | 85.7 | 88.8 | 91.3 | 91.5 | 92.6 | 90.5 | 87.8 | 84.3 | 77.7 |
| Ra | | 75 | 90 | 96 | 97 | 98 | 98 | 99 | 99 | 99 | 98 | 98 | 97 |
| R9 | | 30 | 70 | 97 | 99 | 96 | 97 | 99 | 99 | 99 | 98 | 99 | 98 |
| R12 | | 74 | 94 | 95 | 95 | 97 | 94 | 98 | 94 | 95 | 93 | 85 | 78 |
| TLCI | | 72 | 91 | 95 | 99 | 99 | 99 | 99 | 99 | 100 | 99 | 100 | 99 |

5500K SPECTRAL WAVEFORM

LIGHT EMITTING MODULE, AND LIGHTING DEVICE

CROSS REFERENCE TO RELATED APPLICATIONS

This application is a national phase of International Patent Application No. PCT/JP2021/028507, filed Jul. 30, 2021; which claims priority to Japanese Patent Application No. 2021-055101, filed Mar. 29, 2021; all of which are incorporated by reference herein in their entirety.

TECHNICAL FIELD

The present disclosure relates to a light emitting module, and a lighting device.

BACKGROUND ART

Light emitting modules have been proposed in which a first light and a second light are mixed to output light in which, in a color temperature range of 2000K to 3200K, a general color rendering index Ra is 90 or greater, and a special color rendering index R9 is 90 or greater (for example, Patent Literature 1).

CITATION LIST

Patent Literature

Patent Literature 1: Unexamined Japanese Patent Application Publication No. 2020-119723

SUMMARY OF INVENTION

Technical Problem

In light emitting modules such as that described in Patent Literature 1, a high color rendering index is obtained only when the color temperature is a comparatively low correlated color temperature and, also, is in a narrow correlated color temperature range, namely from 2000K to 3200K. However, no disclosure is made for comparatively high correlated color temperatures of 3500K and higher. As such, there is a demand for a light emitting module that can output light having high color rendering at comparatively high correlated color temperatures or, alternatively, in a wider range of correlated color temperatures.

The present disclosure is made with the view of the above situation, and an objective of the present disclosure is to provide a light emitting module and a lighting device that emit light having higher color rendering.

Solution to Problem

A light emitting module of the present disclosure that achieves the objective described above includes:

a first light source that emits light having a first correlated color temperature;

a second light source that emits light having a second correlated color temperature higher than the first correlated color temperature; and five types of colored light sources, each capable of emitting light having a different emission light color, wherein the first light source, the second light source, and the five types of colored light sources are each caused to emit light at a predetermined luminescence intensity ratio, thereby enabling emission of mixed light that has a correlated color temperature of 5000K to 6500K and in which a general color rendering index Ra is 98 or greater, a special color rendering index R9 is 98 or greater, and a special color rendering index R12 is 94 or greater.

The first correlated color temperature may be 2700K.

The second correlated color temperature may be 5700K.

For example, the first light source may be a light bulb-color light source, the second light source may be a white light source, and the five types of colored light sources may include a violet light source, a blue light source, a cyan light source, a lime light source, and a red light source.

The first light source, the second light source, and the five types of colored light sources may each be caused to emit light at a predetermined luminescence intensity ratio, thereby enabling emission of mixed light that has a correlated color temperature of 5000K to 6500K and in which the general color rendering index Ra and the special color rendering index R9 are 99.

Mixed light that has a correlated color temperature from 5000K to 6500K may be emitted by causing each of the first light source, the second light source, and the lime light source to emit light at a sufficiently higher luminescence intensity than a total of the luminescence intensities of the five types of colored light sources, excluding the lime light source.

For example, the correlated color temperature of emission light of the first light source may be 2700K, the correlated color temperature of emission light of the second light source may be 5700K, and the five types of colored light sources may include a third light source that emits violet light, a fourth light source that emits blue light, a fifth light source that emits cyan light, a sixth light source that emits lime light, and a seventh light source that emits red light.

In such a case, the first to seventh light sources are caused to emit at a luminous flux ratio of 24000:0:0:0:0:0:0 to obtain mixed light having a correlated color temperature of 2700K, or emit at a luminous flux ratio of 22000:0:4.6:220:110:2750:0 to obtain mixed light having a correlated color temperature of 3000K, or emit at a luminous flux ratio of 20000:4600:10.9:330:530:4000:0 to obtain mixed light having a correlated color temperature of 3500K, or emit at a luminous flux ratio of 19000:11400:19.3:530:760:5300:0 to obtain mixed light having a correlated color temperature of 4000K, or emit at a luminous flux ratio of 14800:14700:88:1050:1740:9590:87 to obtain mixed light having a correlated color temperature of 5000K, or emit at a luminous flux ratio of 11000:16900:92:1350:1930:11000:230 to obtain mixed light having a correlated color temperature of 5500K, or emit at a luminous flux ratio of 6000:18000:100.6:1500:1300:8000:0 to obtain mixed light having a correlated color temperature of 6500K, or emit at a luminous flux ratio of 3100:15000:111.5:1500:1000:6600:0 to obtain mixed light having a correlated color temperature of 8000K, or emit at a luminous flux ratio of 2200:15000:159.2:1500:1800:6600:0 to obtain mixed light having a correlated color temperature of 10000K, or emit at a luminous flux ratio of 0:15000:226.3:1500:2200:5200:0 to obtain mixed light having a correlated color temperature of 20000K.

The light emitting module may further include light modulation control means capable of modulating each of the first light source, the second light source, and the five types of colored light sources with predetermined steps of resolution, wherein the light modulation control means performs modulation by combining frequency modulation (FM), pulse width modulation (PWM), and direct current (DC) modulation.

Each of a plurality of the first light source and a plurality of the second light source may be radially arranged in a direction from near a center of a circular substrate toward a circumference of the circular substrate.

A lighting device of the present disclosure includes the light emitting module; and may further include a control device that controls the light modulation control means that modulates the first light source, the second light source, and the five types of colored light sources, wherein the control device may include a storage that stores, in advance, a table expressing relationships between a luminescence intensity of the first light source, the second light source, and the five types of colored light sources, and the correlated color temperature, reference the table stored in the storage to determine the luminescence intensity of the first light source, the second light source, and the five types of colored light sources corresponding to the desired correlated color temperature, and control, based on the determined luminescence intensity, the light modulation control means.

The lighting device may further include a reflector that includes a reflecting surface perpendicular to an arrangement plane of the first light source, the second light source, and the five types of colored light sources of the light emitting module, and that reflects light emitted by the light emitting module, and a diffusion plate that is provided on a side of the reflector opposite the light emitting module, and that diffuses light reflected by the reflector.

The lighting device may include a lens that extends substantially parallel to an arrangement plane of the first light source, the second light source, and the five types of colored light sources of the light emitting module, and that converges or diverges light emitted by the light emitting module, and a lens diffusion plate that extends substantially parallel to the lens, and that diffuses/shapes light that passes through the lens.

Advantageous Effects of Invention

According to the present disclosure, light having high color rendering can be emitted.

BRIEF DESCRIPTION OF DRAWINGS

FIG. 2 is a drawing illustrating an example of LEDs (light sources) constituting the light emitting module;

FIG. 5 is a drawing illustrating a duty ratio and the like in PWM modulation;

FIG. 6 is a drawing illustrating color rendering and the like achieved by the light emitting module;

DESCRIPTION OF EMBODIMENTS

Embodiment 1

Hereinafter, a light emitting module according to Embodiment 1 of the present disclosure is described while referencing the drawings.

Light Emitting Module

Figure 1:
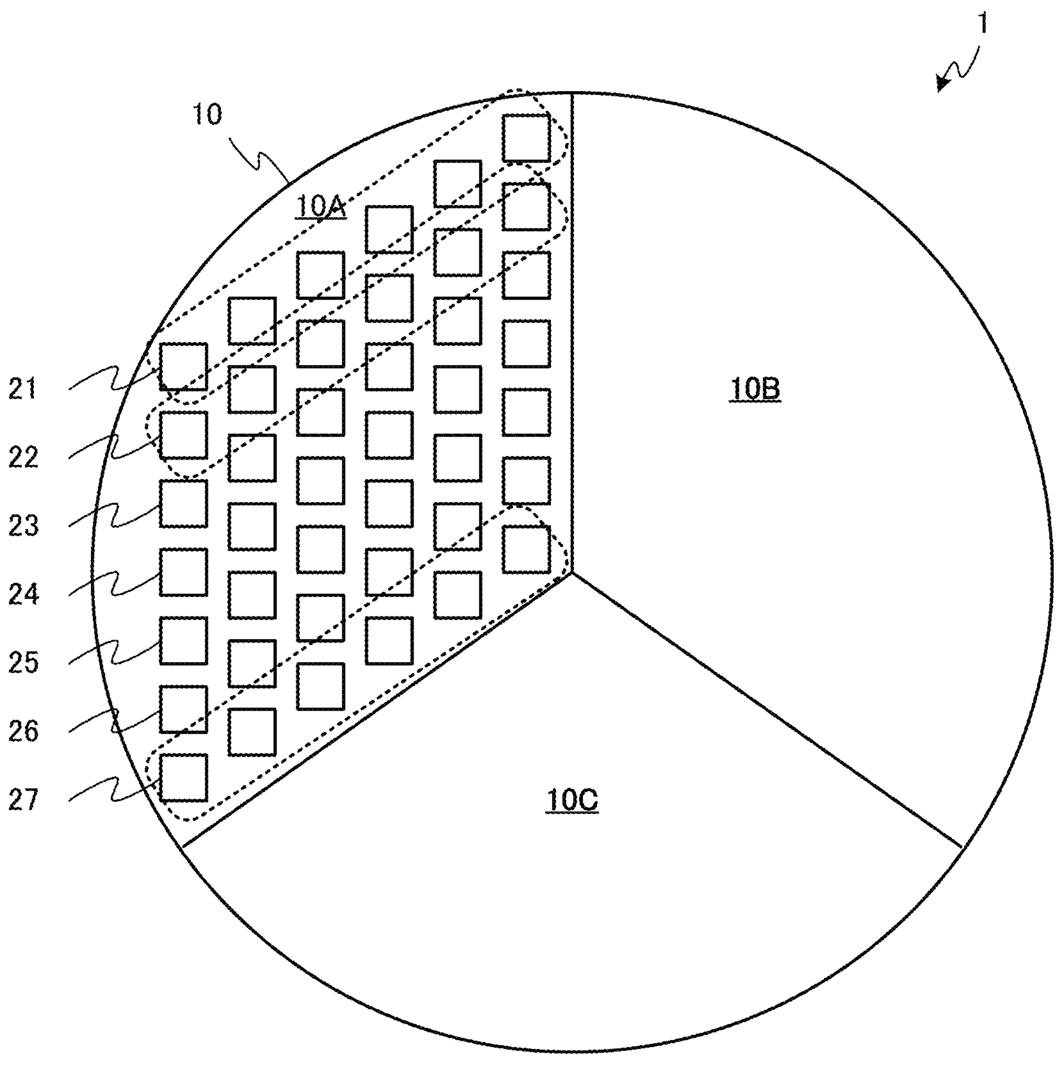
FIG. 1 is a plan view illustrating a configuration example of a light emitting module of Embodiment 1.

FIG. 1 is a plan view illustrating a configuration example of a light emitting module 1 according to the present embodiment. As illustrated in FIG. 1, the light emitting module 1 includes a substrate 10, and a plurality of each of light emitting diodes (LEDs) 21 to 27.

In one example, the substrate 10 is implemented as an LED substrate for installing chip-type LEDs by soldering or the like. In one example, the substrate 10 is obtained by covering the surface of a metal plate, such as copper or the like, with an insulation material, and forming a wiring pattern on the covering layer. An input/output terminal for electrically connecting the installed LEDs to a power supply and/or an LED driver is provided on the substrate 10.

As illustrated in FIG. 1, the substrate 10 of the present embodiment is formed in a circle, which is trisected into three regions 10A, 10B, and 10C. In FIG. 1, an example is illustrated in which the LEDs 21 to 27 are provided only in the region 10A, but the LEDs 21 to 27 are also provided in the regions 10B and 10C with the same arrangement. That is, in the light emitting module 1, all of the LEDs 21 to 27 provided in the regions 10A, 10B, and 10C of the substrate 10 are used to generate mixed light and enable emission.

Note that the configurations of the light emitting module 1 and the substrate 10 illustrated in FIG. 1 (the presence/absence of the regions, the wiring pattern, and the installation positions of the LEDs) are examples. The present disclosure is not limited to the descriptions set forth in this embodiment, and it is sufficient that desired types and numbers of light emitting elements such as LEDs can be arranged in order to cause the light emitting module 1 to function as a light source that emits light of a desired color and luminance (luminous flux). Additionally, other components such as a heat dissipation mechanism for dissipating heat may be provided on the substrate 10.

The LEDS 21 to 27 include a plurality of first color LEDs 21 that serves as a first light source that emits light having a first correlated color temperature (for example, light bulb-color light), a plurality of second color LEDs 22 that serves as a second light source that emits light having a second correlated color temperature higher than the first correlated color temperature (for example, daylight-color light), a plurality of third color LEDs 23, a plurality of fourth color LEDs 24, a plurality of fifth color LEDs 25, a plurality of sixth color LEDs 26, and a plurality of seventh color LEDs 27.

The third color LEDs 23, the fourth color LEDs 24, the fifth color LEDs 25, the sixth color LEDs 26, and the seventh color LEDs 27 are color LEDs that are each capable of emitting a different color, and function as five types of colored light sources.

Note that, in the following description, the first color LEDs 21, the second color LEDs 22, the third color LEDs 23, the fourth color LEDs 24, the fifth color LEDs 25, the sixth color LEDs 26, and the seventh color LEDs 27 may be referred to simply as LEDs 21, LEDs 22, LEDs 23, LEDs 24, LEDs 25, LEDs 26, and LEDs 27.

In FIG. 1, an example is illustrated in which six each of the LEDs 21 to 27 are provided in the region 10A, but the numbers of the LEDs 21 to 27 can be set as desired provided that each can emit, as a light source, light of a desired luminous flux (luminance). The required number of each of the LEDs is determined by the luminance required as a light source of each of the LEDs, and the luminance (maximum luminance) per one LED. For example, in the light emitting module 1 of the present embodiment, as described later referencing FIG. 6, the 2700K LEDs 21 are caused to emit a maximum of 24000 lumen (Lm). Accordingly, assuming that the luminous flux per one LED 21 is 400 lumen, it is sufficient that at least 60 (=24000/400) of the LEDs 21 are provided on the entirety of the substrate 10. Additionally, the cyan LEDs 25 are caused to emit a maximum of 2200 lumen (Lm) and, as such, provided that the luminous flux of the LEDs 25 is 100 lumen per one LED 25, it is sufficient that at least 22 (=2200/100) of the LEDs 25 are provided on the entirety of the substrate 10.

FIG. 2 is a drawing illustrating an example of the LEDs 21 to 27. As illustrated in FIG. 2, the LEDs 21 of the present embodiment are constituted from light bulb-color LEDs. More specifically, in one example, the LEDs 21 are constituted from LEDs capable of emitting light bulb-color light, at a correlated color temperature of 2700K (kelvin), in which chromaticity coordinates (medians) in the chromaticity diagram specified by CIE (International Commission on Illumination) (CIE1931) are (0.4578, 0.4101).

Additionally, the LEDs 22 are constituted from white LEDs. More specifically, in one example, the LEDs 22 are constituted from LEDs capable of emitting light, at a correlated color temperature of 5700K (kelvin), in which the chromaticity coordinates (medians) in CIE1931 are (0.3287, 0.3417).

Note that the term "correlated color temperature" refers to a temperature expressed by the color (temperature) of blackbody radiation perceived to most resemble the light source color. The unit of the correlated color temperature is kelvin (K). The correlated color temperature is a scale that expresses the color (bluish, reddish, or the like) of the light source, and is a value expressed by the color (temperature) of blackbody radiation perceived to most resemble the color of the light source.

A peak wavelength λp of the LEDs 23 is located in a range of 420 nm to 430 nm, and the LEDs 23 are capable of emitting violet (VLT) light.

A dominant wavelength λd of the LEDs 24 is located in a range of 475 nm to 480 nm, and the LEDs 24 are capable of emitting blue (BLU) light.

A dominant wavelength λd of the LEDs 25 is located in a range of 496 nm to 500 nm, and the LEDs 25 are capable of emitting cyan (CYN) light.

In one example, the LEDs 26 are capable of emitting lime green (LME) light in which the chromaticity coordinates (medians) in CIE1931 are (0.4140, 0.5430).

A dominant wavelength λd of the LEDs 27 is located in a range of 624 nm to 634 nm, and the LEDs 27 are capable of emitting red (RED) light.

Note that the characteristics of the LEDs illustrated in FIG. 2 are examples, the present disclosure is not limited thereto, and a configuration is possible in which LEDs having characteristics that are substantially the same or within a margin of error are used. For example, when using LEDs of the same color, LEDs having different peak wavelengths and/or different dominant wavelengths may be used. Specifically, provided that the medians match for the peak wavelengths and/or the dominant wavelengths, the emitted light may have different bandwidths.

Due to variations in LEDs from product to product and the like, the numerical values of the LED characteristics and the like need not match perfectly and, in this technical field, it is sufficient that the numerical values be with a range understood to be in the same range. For example, the correlated color temperature of 2700K includes temperatures in a predetermined error range (for example, 2%) of 2646K to 2754K. The same is applicable to the other numerical values described in the embodiments.

Figure 3:
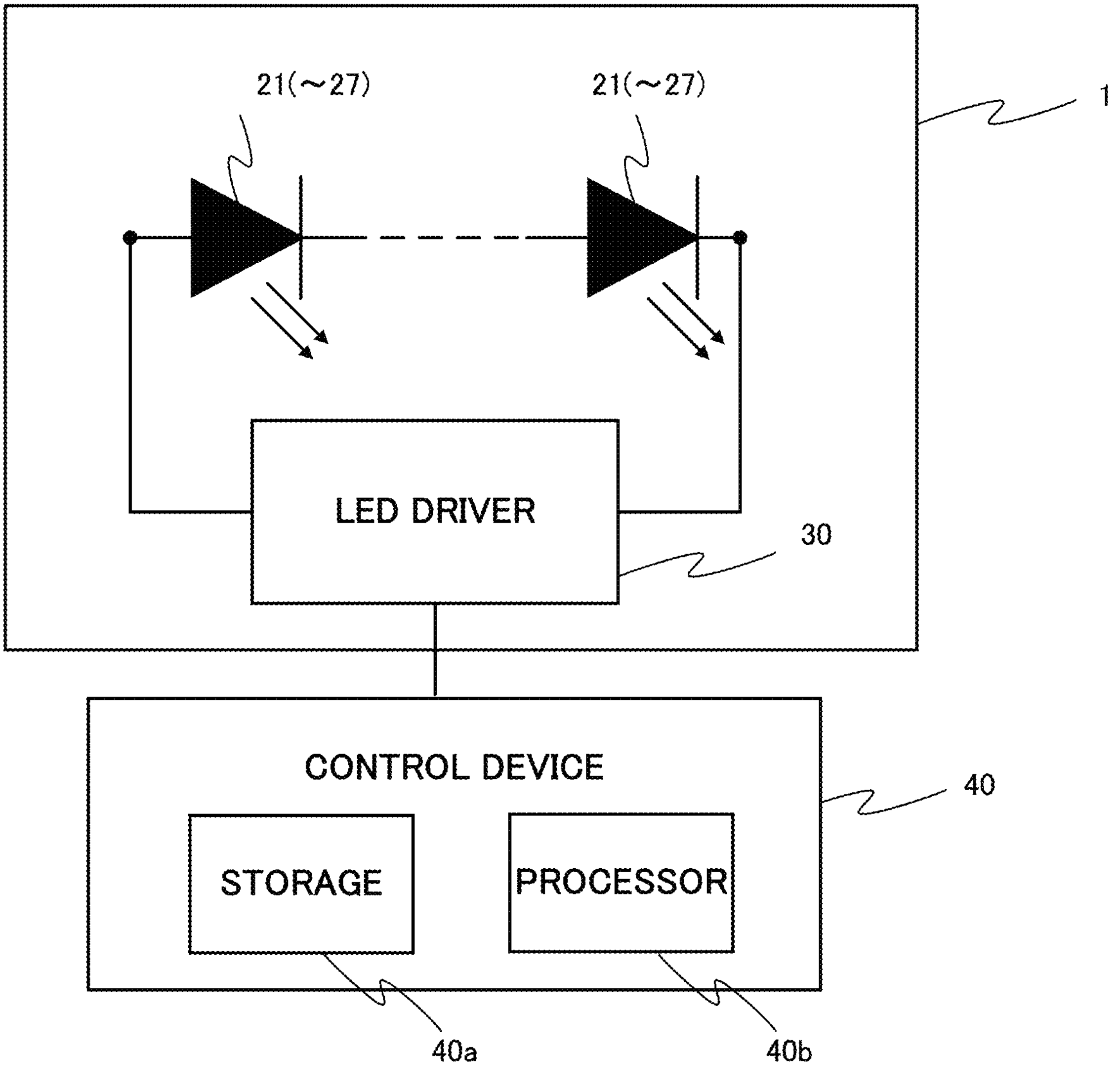
FIG. 3 is a block diagram illustrating an example of the configuration of the light emitting module.

FIG. 3 is a block diagram illustrating an example of the configuration of the light emitting module 1. As illustrated in FIG. 3, the plurality of LEDs 21 are connected to each other in series, and connected to a LED driver 30. The LED driver 30 includes a circuit for lighting the LEDs 21 at a predetermined luminous flux (luminance), and applies current to the plurality of LEDs 21 connected in series. In FIG. 3, an example is illustrated in which the LED driver 30 is connected to the LEDs 21, but the LED driver 30 is provided for each of the color LEDs 21 to 27. Each LED driver 30 is connected to a control device 40 that controls the output current of the LED driver 30. The LED driver 30 is capable of lighting, on the basis of the control of the control device 40, each of the color LEDs 21 to 27 at a desired luminous flux at predetermined steps of resolution (for example, 8192 steps). That is, the LED drivers 30 are capable of modulating each of the color LEDs 21 to 27 to a desired luminance at predetermined steps of resolution.

The LED driver 30 of the present embodiment performs modulation of the LEDs by combining PWM modulation in which modulation is performed by pulse width modulation (PWM) control, and direct current (DC) modulation in which modulation is performed by increasing/decreasing the current.

Figure 4:
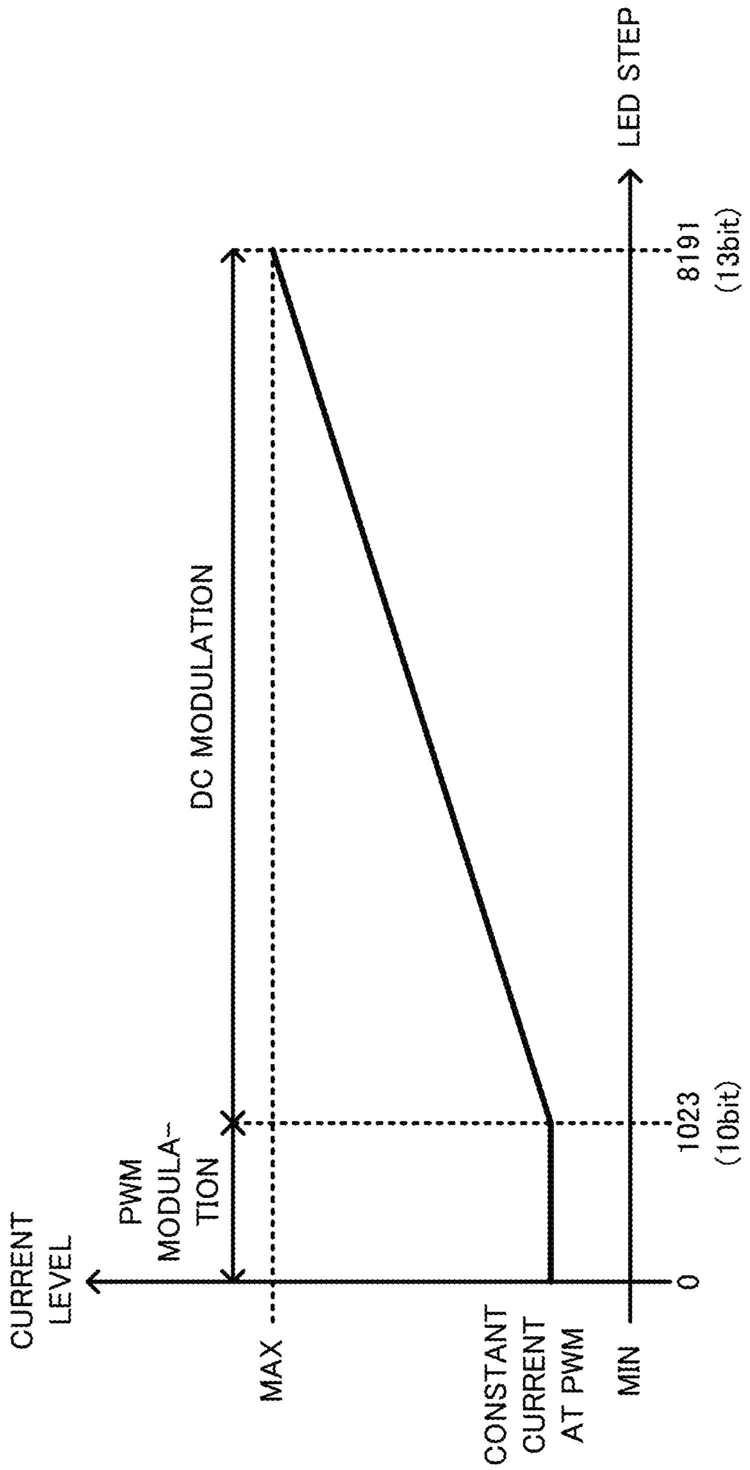
FIG. 4 is a drawing illustrating the relationship between output current of an LED driver and steps of the LED.

FIG. 4 is a drawing illustrating the relationship between the output current of one LED driver 30 and the steps of the LEDs. As illustrated in FIG. 4, at the 0 to 1023 low luminance steps (1024 steps), the LED driver 30 performs modulation of the LEDs by PWM modulation in which the output current is set to constant, and the duty ratio and the output frequency of the pulse wave are changed. Moreover, at steps 1024 to 8191, the LED driver 30 performs modulation of the LEDs by DC modulation in which the output current level is increased/decreased. Thus, the LED driver 30 of the present embodiment combines the PWM modulation and the DC modulation to enable modulation of the LEDs at a total 8192 steps (13 bit) of resolution.

Thus, the LED driver 30 of the present embodiment can realize fine modulation by using the PWM modulation at low luminance steps less than a reference, and can prevent flickering due to flashing by using the DC modulation at high luminance steps of a predetermined level or higher.

Note that a MAX value of the current level and the value of the constant current when performing the PWM in FIG. 4 are determined by the characteristics of the LEDs to be controlled.

FIG. 5 is a drawing illustrating the duty ratio and the like in the PWM modulation at low luminance. The resolution of the PWM modulation is 1024 step (10 bit) resolution. As illustrated in FIG. 5, a modulation period based on one modulation signal output by the control device 40 is 2000 μs, and eight PWM pulse waves are generated in one 2000 μs period. The duty ratio range of each pulse is from 0/128 to 128/128. A minimum pulse width of the pulse wave (duty ratio 1/128) is about 1.95 μs (=2000 μs/8/128). That is, the pulse width of each pulse varies in a range of 1.95 to 250 μs.

The duty ratio of each pulse and the total value of the pulse width at each step are as illustrated in FIG. 5. The luminance of the LEDs increases as the total value of the pulse width increases.

At 0 to 7 steps, a period with a duty ratio of 0 is provided to thin out the pulses. Due to this, the number of pulses output during one 2000 μs period varies from 0 to 8 and, as a result, the frequency of the PWM pulse wave changes from 0 Hz to 4 KHz. That is, at 0 to 8 steps, it can be said that the modulation is frequency modulation (FM).

Thus, the LED driver 30 of the present embodiment can suitably modulate the LEDs by combining the FM modulation, the PWM modulation, and the DC modulation.

Note that the modulation signal of the LED driver 30 is constituted of 13 bits, and the LEDs to be controlled can be caused to light at a predetermined luminance by the control device 40 inputting, into the LED driver 30, modulation signals having a values corresponding to modulation operations or the like.

The number of LEDs connected to the LED driver 30 may be set as desired. The LEDs are not limited to being connected in series, and a combination of series and parallel connections may be employed. Additionally, the LED driver 30 is not limited to the example described in the present embodiment, and it is sufficient that the LED driver 30 is capable of lighting each of the color LEDs 21 to 27 with the predetermined resolution. For example, the LED driver 30 may light the LEDs with only the PWM modulation or the DC modulation, or may use another control method. Additionally, the resolution of the LED driver 30 is not limited to 8192 (13 bit) steps, and the step for changing from the PWM modulation to the DC modulation can be changed as desired. Moreover, the duty ratios illustrated in FIG. 5 can be changed and, for example, it is sufficient that the pulse width total corresponds to the step value.

Color Rendering

FIG. 6 illustrates measurement results of the luminous flux (luminance), the total luminous flux, and the color rendering (Ra, R9, R12, TLCI) of each LCD from when the light emitting module 1 is caused to emit light at correlated color temperatures of 2000K to 20000K.

The average color rendering index (Ra) is the average color rendering index defined by CIE, and expresses a score obtained by averaging color rendering indexes scored using an eight color (R1 to R8) color chart. R9 and R12 are special color rendering indexes defined by CIE, and respectively express color rendering indexes that use color charts of R9 and R12 test colors. The television lighting consistency index (TLCI) is an evaluation standard, defined by the European Broadcasting Union, for studio lighting and lighting apparatuses. Each of these scores is a color rendering index, and can be measured using a dedicated measuring device or the like. The value of each index ranges from 0 to 100, with 100 representing the highest color rendering.

Note that FIG. 6 illustrates an example in which the LEDs illustrated in FIG. 2 are used as LEDs 21 to 27. The luminous flux of each of the LEDs is a value obtained by modulating so that the waveform of the emitted light matches the waveform (D50, D55, D65, and the like) of a CIE standard light source having a Ra value of 100. Note that, although the violet (VLT) LEDs contribute to a color tone and color rendering, the violet LEDs do not contribute significantly to (Lm) due to human visibility characteristics. As such, in FIG. 6, the values of (W) and (Lm) are illustrated together for the violet LEDs. Note that, in the present example, there is a relationship of Lm=coefficient K×W (where coefficient K=8.38).

Specifically, the following can be understood from FIG. 6.

1) Mixed light having a correlated color temperature of 2700K and in which the total luminous flux is 24000 (Lm) can be obtained by causing the LEDs 21 to 27 to respectively emit at 24000 (Lm), 0 (Lm), 0 (Lm), 0 (Lm), 0 (Lm), 0 (Lm), and 0 (Lm). Power consumption in such a case is 292.1 (W), and emission efficiency is 82.2 (Lm/W). In this case, Ra is 96, R9 is 97, R12 is 95, TLCI is 95, and high color rendering is obtained.
2) Mixed light having a correlated color temperature of 3000K and in which the total luminous flux is 25085 (Lm) can be obtained by causing the LEDs 21 to 27 to respectively emit at 22000 (Lm), 0 (Lm), 4.6 (Lm), 220 (Lm), 110 (Lm), 2750 (Lm), and 0 (Lm). Power consumption in such a case is 292.7 (W), and emission efficiency is 85.7 (Lm/W). In this case, Ra is 97, R9 is 99, R12 is 95, TLCI is 99, and high color rendering is obtained.
3) Mixed light having a correlated color temperature of 3500K and in which the total luminous flux is 29471 (Lm) can be obtained by causing the LEDs 21 to 27 to respectively emit at 20000 (Lm), 4600 (Lm), 10.9 (Lm), 330 (Lm), 530 (Lm), 4000 (Lm), and 0 (Lm). Power consumption in such a case is 331.8 (W), and emission efficiency is 88.8 (Lm/W). In this case, Ra is 98, R9 is 96, R12 is 97, TLCI is 99, and high color rendering is obtained.
4) Mixed light having a correlated color temperature of 4000K and in which the total luminous flux is 37009 (Lm) can be obtained by causing the LEDs 21 to 27 to respectively emit at 19000 (Lm), 11400 (Lm), 19.3 (Lm), 530 (Lm), 760 (Lm), 5300 (Lm), and 0 (Lm). Power consumption in such a case is 405.5 (W), and emission efficiency is 91.3 (Lm/W). In this case, Ra is 98, R9 is 97, R12 is 94, TLCI is 99, and high color rendering is obtained.
5) Mixed light having a correlated color temperature of 5000K and in which the total luminous flux is 42055 (Lm) can be obtained by causing the LEDs 21 to 27 to respectively emit at 14800 (Lm), 14700 (Lm), 88.0 (Lm), 1050 (Lm), 1740 (Lm), 9590 (Lm), and 87 (Lm). Power consumption in such a case is 459.6 (W), emission efficiency is 91.5 (Lm/W), Ra and R9 are 99, R12 is 98, TLCI is 99, and high color rendering is obtained.
6) Mixed light having a correlated color temperature of 5500K and in which the total luminous flux is 42502 (Lm) can be obtained by causing the LEDs 21 to 27 to respectively emit at 11000 (Lm), 16900 (Lm), 92.0 (Lm), 1350 (Lm), 1930 (Lm), 11000 (Lm), and 230 (Lm). Power consumption in such a case is 458.9 (W), and emission efficiency is 92.6 (Lm/W). In this case, Ra and R9 are 99, R12 is 94, TLCI is 99, and high color rendering is obtained.

7) Mixed light having a correlated color temperature of 6500K and in which the total luminous flux is 34901 (Lm) can be obtained by causing the LEDs 21 to 27 to respectively emit at 6000 (Lm), 18000 (Lm), 100.6 (Lm), 1500 (Lm), 1300 (Lm), 8000 (Lm), and 0 (Lm). Power consumption in such a case is 385.5 (W), and emission efficiency is 90.5 (Lm/W). In this case, Ra and R9 are 99, R12 is 95, TLCI is 100, and high color rendering is obtained.

8) Mixed light having a correlated color temperature of 8000K and in which the total luminous flux is 27311 (Lm) can be obtained by causing the LEDs 21 to 27 to respectively emit at 3100 (Lm), 15000 (Lm), 111.5 (Lm), 1500 (Lm), 1000 (Lm), 6600 (Lm), and 0 (Lm). Power consumption in such a case is 311.0 (W), and emission efficiency is 87.8 (Lm/W). In this case, Ra and R9 are 98, R12 is 93, TLCI is 99, and high color rendering is obtained.

9) Mixed light having a correlated color temperature of 10000K and in which the total luminous flux is 27259 (Lm) can be obtained by causing the LEDs 21 to 27 to respectively emit at 2200 (Lm), 15000 (Lm), 159.2 (Lm), 1500 (Lm), 1800 (Lm), 6600 (Lm), and 0 (Lm). Power consumption in such a case is 323.4 (W), and emission efficiency is 84.3 (Lm/W). In this case, Ra is 98, R9 is 99, R12 is 85, TLCI is 100, and high color rendering is obtained.

10) Mixed light having a correlated color temperature of 20000K and in which the total luminous flux is 24126 (Lm) can be obtained by causing the LEDs 21 to 27 to respectively emit at 0 (Lm), 15000 (Lm), 226.3 (Lm), 1500 (Lm), 2200 (Lm), 5200 (Lm), and 0 (Lm). Power consumption in such a case is 310.6 (W), and emission efficiency is 77.7 (Lm/W). In this case, Ra is 97, R9 is 98, R12 is 78, TLCI is 99, and sufficient color rendering is obtained.

Thus, with the light emitting module 1 of the present embodiment, by causing the LEDs 21 to 27 to emit at the intensities (luminous flux) illustrated in FIG. 6, it is possible to achieve mixed light (mixed light can be emitted) that has a correlated color temperature from 5000 to 6500K that corresponds to the color temperature of daylight, and in which Ra and R9 are 98 or greater (99), R12 is 94 or greater, and TLCI is 99 or greater.

In the examples illustrated in FIG. 6, ratios of the luminescence intensities from when the correlated color temperatures is from 5000 to 6500K, Ra and R9 are 98 or greater (99), and R12 is 94 or greater are ratios in which the luminescence intensity of each of the 2700K LEDs 21, the 5600K LEDs 22, and the lime LEDs are sufficiently higher than the total of the luminescence intensities of the other four types of colored light sources.

Furthermore, with the light emitting module 1, high color rendering can be achieved. For example, Ra is 98 or greater at the correlated color temperatures of 3500K to 10000K (96 or greater at 2700K to 20000K, and 90 or greater at 2500K to 20000K), R9 is 97 or greater at the correlated color temperatures of 2700K to 20000K, R12 is 95 or greater at the correlated color temperatures of 2700K to 6500K (93 or greater at 2500K to 8000K), and TLCI is 99 or greater at the correlated color temperatures of 3000K to 20000K (95 or greater at the correlated color temperatures of 2700K to 20000K, 91 or greater at the correlated color temperatures of 2500K to 20000K).

Moreover, in the wide range of correlated color temperatures of 2700K to 8000K, extremely high color rendering can be achieved, namely Ra, R9, and R12 are all 93 or greater. Additionally, for Ra and R9 specifically, 97 or greater can be achieved in the wide range of correlated color temperatures of 3000K to 20000K.

Provided that the luminous flux of the LEDs 21 to 27 is maintained at the ratios illustrated in FIG. 6, similar color rendering can be demonstrated, even when the total luminous flux (brightness) changes. That is, by raising/lowering the luminous flux of each of the LEDs while maintaining the luminous flux ratios illustrated in FIG. 6, the brightness can be changed while ensuring similar color rendering.

Thus, with the light emitting module 1 of the present embodiment, seven colors of LEDs can be lighted at predetermined intensity ratios (luminous flux, luminance) by driving, on the basis of the control of the control device 40, each LED driver 30 connected to the seven colors of LEDs 21 to 27. As a result, the light emitting module 1 can emit mixed light having high color rendering. This light emitting module 1 can be advantageously applied to a lighting device that requires color rendering.

The luminous flux ratios (luminance ratios), of the emission light of each of the LEDs 21 to 27 at each correlated color temperature, obtained from FIG. 6 are not strict. Deviation of about ±10% is acceptable. This interpretation also applies to the claims. The ratios may be simplified in order to facilitate control. For example, the luminous flux ratio when the correlated color temperature is 5000K may be simplified (adjusted) such as 15000:15000:90:1050:1750:9600:90=1500:1500:9:105:175:960:9. Likewise, the luminous flux ratio when the correlated color temperature is 6500K may be simplified such as 6000:18000:100:1500:1300:8000:0=60:180:1:15:13:80:0. Additionally, the LEDs set to not light may be lit at inconspicuous levels.

Figure 7:
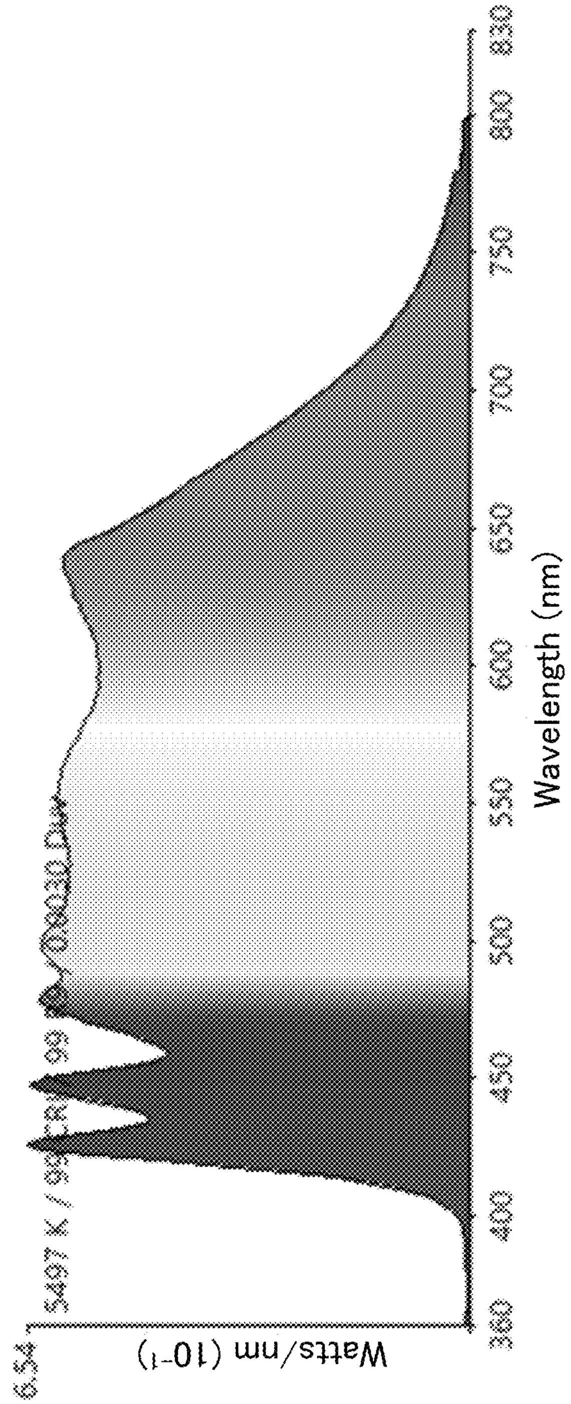
FIG. 7 is a drawing illustrating a spectral waveform of light from the light emitting module.

FIG. 7 illustrates a spectral waveform from when the light emitting module 1 emits light at the correlated color temperature of 5500K. As illustrated in FIG. 7, according to the light emitting module 1, at the correlated color temperature of 5500K that corresponds to daylight, a spectral waveform similar to waveform D55 of a CIE standard light source can be obtained. Likewise, according to the light emitting module 1, at the correlated color temperatures of 5000K, 6500K, and 7500K, spectral waveforms similar to waveforms D50, D65, D75, and the like can be obtained. Note that, here, error of about 6% is allowed for the correlated color temperature.

Note that, when using 2000K and 2500K in lighting, efficiency and color rendering are poor and, as such, it is desirable that the light emitting module 1 is used in the range of 2700K to 20000K.

Lighting Device

Figure 8:
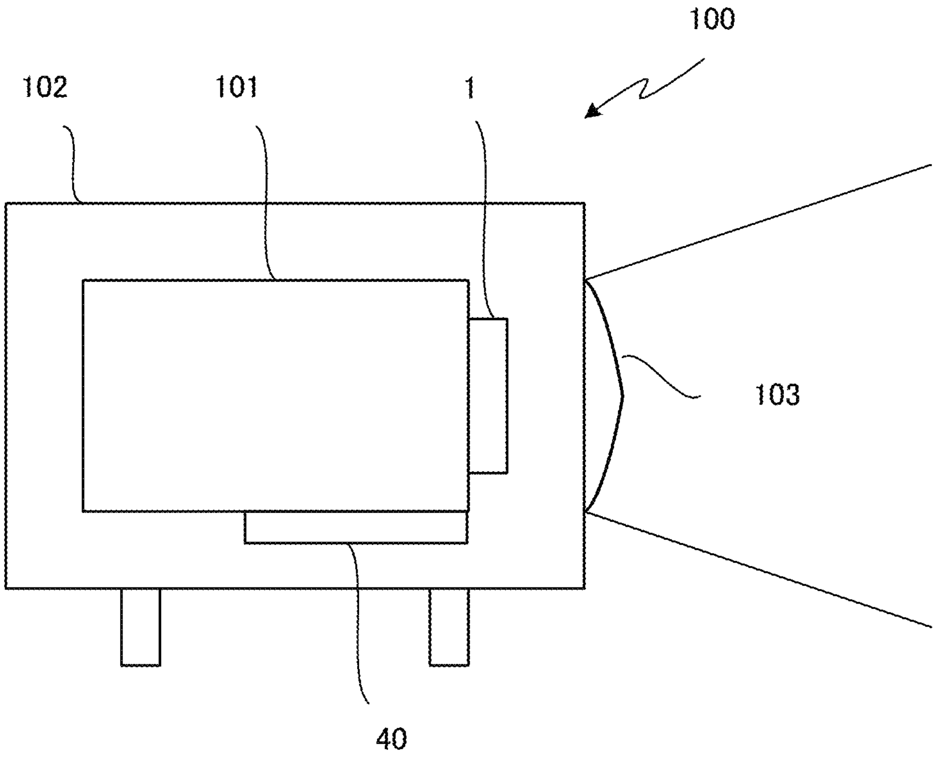
FIG. 8 is a configuration drawing of a spotlight lighting device to which the light emitting module of Embodiment 1 is applied.

Next, a spotlight lighting device 100 in which the light emitting module 1 is applied is described as an application example of the light emitting module 1 of the present embodiment. FIG. 8 is a configuration diagram of the spotlight lighting device 100 according to the present embodiment. The spotlight lighting device 100 includes the light emitting module 1 described above, a heat dissipater (heat sink) 101, a housing 102, and a lens 103. Additionally, the spotlight lighting device 100 includes a control device 40 for controlling the correlated color temperature, the luminance, and the like of the emitted light, and a non-illustrated power supply.

The heat dissipater (heat sink) 101 radiates heat generated in the light emitting module 1 out of the spotlight lighting device 100. The light emitting module 1 is provided on one end of the heat dissipater 101. In one example, the heat dissipater 101 is formed from a plurality of heat dissipating plates including copper or the like, a heat pipe connected to the plurality of heat dissipating plates, and the like.

The housing 102 is a box-shaped member provided so as to cover the heat dissipater 101 and the light emitting module 1, and is supported by legs. An opening is provided on the light emitting module 1 side end of the housing 102. In one example, the housing 102 is formed from an aluminum alloy or the like.

The lens 103 is provided on the opening of the housing 102, and converges or diverges the light emitted from the light emitting module 1. It is sufficient that the lens 103 is, for example, a Fresnel lens that has a sawtooth cross-section.

Note that the spotlight lighting device 100 may include a position adjustment mechanism for adjusting a position of the light emitting module 1 relative to the lens 103, a color filter for changing the color of the emitted light, and the like.

In one example, the control device 40 includes a storage 40*a* and a processor 40*b*. A table, in which the correlated color temperatures and the intensity ratios of the seven colors of LEDs 21 to 27 are associated, is stored in advance in the storage 40*a*. For example, a table illustrating the ratios of the luminous flux of the LEDs 21 to 27 relative to the total luminous flux for the correlated color temperatures of 2700K, 3000K, 3500K, 4000K, 5000K, 5500K, 6500K, 8000K, 10000K, and 20000K illustrated in FIG. 6 is stored in the storage 40*a*. A table illustrating the correspondence between the luminous flux and a driving method necessary to obtain that luminous flux is stored in the storage 40*a* for each of the LEDs 21 to 27. Specifically, the storage 40*a* stores, for small luminous fluxes, a table in which the "step" illustrated in FIG. 5 are replaced with luminous flux (Lm) and, for large luminous fluxes (luminous fluxes for which it is necessary to drive at a duty ratio of 1 or greater), a table in which the luminous flux and a current value of DC current applied to the series circuit of the LEDs are associated.

The processor 40*b* executes control operations in accordance with a program stored in internal memory. When a user operates a control knob or inputs, from an external device, the desired correlated color temperature and brightness (total luminous flux) of the light, the processor 40*b* acquires these pieces of information. The processor 40*b* reads, from the storage 40*a*, the luminous flux ratios of the LEDs 21 to 27 for the inputted correlated color temperature, and multiplies the read ratios by a value corresponding to the brightness to calculate the luminance (luminous flux) of each of the LEDs 21 to 27.

The processor 40*b* identifies the driving method needed to obtain the calculated luminance of each of the LEDs 21 to 27. The processor 40*b* outputs, on the basis of the identified driving method and to the LED driver 30, modulation signals for executing the FM modulation, the PWM modulation, the DC modulation, and the like. The LED driver 30 drives on the basis of the modulation signals, and causes the LEDs 21 to 27 to emit light. Thus, the lighting device 100 emits mixed light having the desired correlated color temperature and brightness.

Note that the control device 40 is not limited to configurations that use a processor. A configuration is possible in which the control device 40 includes a dedicated chip using application specific integrated circuit (ASIC) technology, or the like.

With the spotlight lighting device 100 according to the present embodiment, the light emitting module 1 that has high color rendering is used as the light source and, as such, light closer to natural light can be emitted, and the spotlight lighting device 100 can be advantageously used in performance spaces such as stages and studios.

The spotlight lighting device 100 may be fixed to a ceiling, a wall, or the like, or may be set on a stand. Note that, here, as the lighting device, an example is described in which the light emitting module 1 is applied to the spotlight lighting device 100. However, the lighting device is not limited to a spotlight and may be any device (for example, a light bulb or the like) that includes the light emitting module 1 described above.

In Embodiment 1, the light source is constituted by LEDs, but a configuration is possible in which the light source is constituted by other light emitting elements such as laser diodes, organic electro luminescence (EL), or the like. Note that the light emitting elements may be any of bullet-type, surface mounting-type, or chip-type light emitting elements.

Moreover, depending on the use, LEDs and light sources other than the LEDs 21 to 27 may be disposed on the substrate 10.

Note that, in FIG. 1, an example is illustrated in which the shape of each of the light emitting elements (the LEDs 21 to 27) is square, but a configuration is possible in which the shape of each of the light emitting elements is rectangular. Additionally, an example is illustrated in which the size of each of the light emitting elements is the same (planar dimensions are the same), but a configuration is possible in which the size of each of the light emitting elements differs. In such a case, the plurality of light emitting elements may include light emitting elements having different sizes and/or shapes.

In FIG. 1, an example is illustrated in which pluralities of light emitting elements (the LEDs 21 to 27) are disposed on the circular substrate 10. However, the shape of the substrate, or the shape of the regions in which the pluralities of light emitting elements are disposed, can be changed as appropriate. For example, a configuration is possible in which the pluralities of light emitting elements are disposed on a rectangular substrate or in rectangular regions. Moreover, the arrangement of the light emitting elements is not limited to the example illustrated in FIG. 1, and a configuration is possible in which the pluralities of light emitting elements are arranged in a grid, a line, radially, or the like, or arranged randomly.

Figure 9:
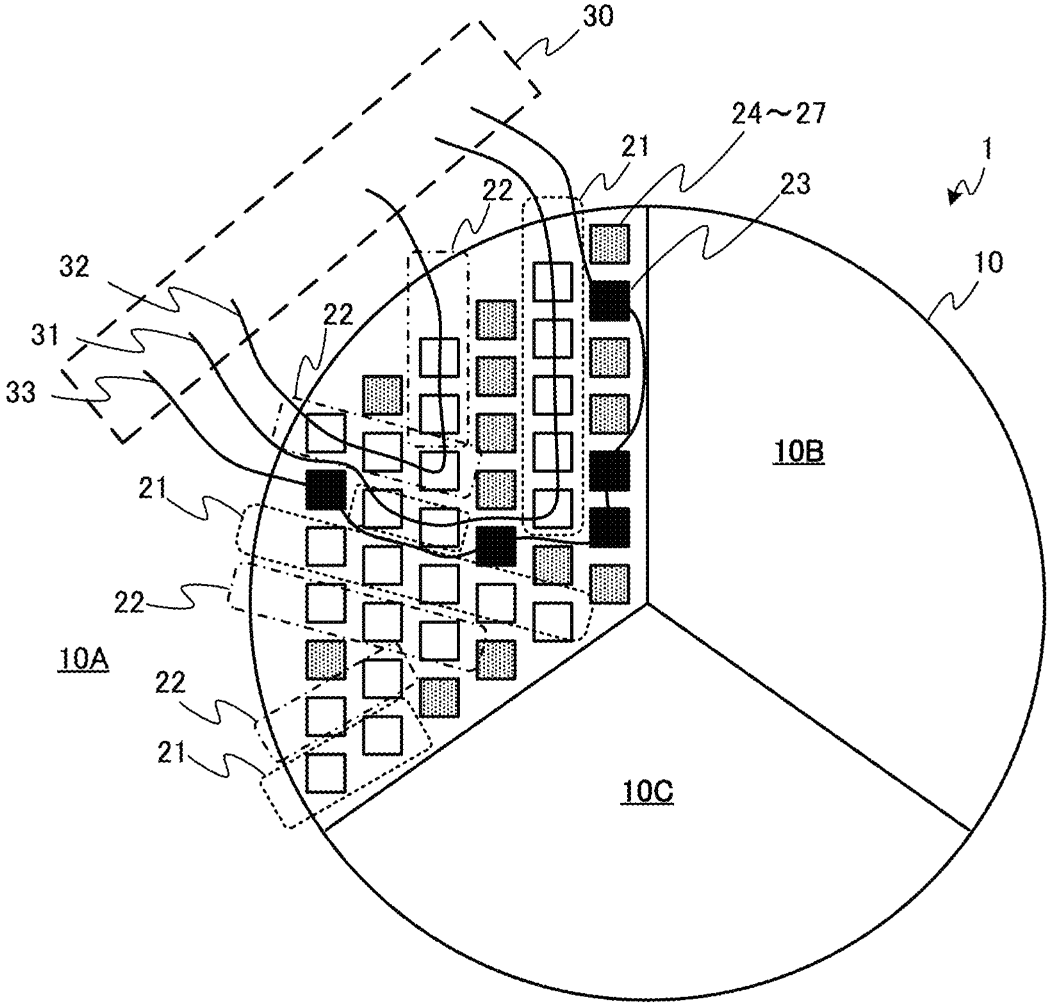
FIG. 9 is a drawing illustrating another example of LEDs (light sources) constituting the light emitting module.

FIG. 9 illustrates another example of the arrangement configuration of the light emitting elements (the LEDs 21 to 27). The arrangement of the light emitting elements on the substrate 10 of the light emitting module 1 illustrated in FIG. 9 differs from that of the light emitting module 1 illustrated in FIG. 1. As in the example illustrated in FIG. 1, the substrate 10 is formed in a circle, which is trisected into the three regions 10A, 10B, 10C. In FIG. 9, an example is illustrated in which the LEDs 21 to 27 are provided only in the region 10A, but the LEDs 21 to 27 are provided in the regions 10A, 10B, and 10C with the same arrangement. That is, in the light emitting module 1, all of the LEDs 21 to 27 provided in the regions 10A, 10B, 10C of the substrate 10 are used to generate mixed light and enable emission.

In the example of FIG. 9, each of the plurality of the first color LEDs 21 and the plurality of the second color LEDs 22 is radially arranged in the direction from near the center of the circular substrate 10 toward the circumference of the circular substrate 10. The first color LEDs 21 is a first light source that emits light having a first correlated light temperature (for example, light bulb-color light), and the second color LEDs 22 is a second light source that emits light having a second correlated color temperature higher than the first correlated color temperature (for example, daylight-color light). In one example, the correlated color temperature of the LEDs 21 is 2700K and the correlated color temperature of the LEDs 22 is 5700K.

The plurality of third color LEDs 23 is arranged at the blackened locations other than the locations illustrated in FIG. 9 where the LEDs 21 and the LEDs 22 are disposed, and the plurality of fourth color LEDs 24, the plurality of fifth color LEDs 25, the plurality of sixth color LEDs 26, and the plurality of seventh color LEDs 27 are arranged at the locations indicated by shading. In the arrangement described above as well, the LEDs 21 to 27 can demonstrate high color rendering by setting the luminous flux to the ratios illustrated in FIG. 6.

FIG. 9 illustrates a wiring 31 for connecting the plurality of LEDs 21 in series, a wiring 32 for connecting the plurality of LEDs 22 in series, and a wiring 33 for connecting the plurality of LEDs 23 in series. Each of the wirings 31, 32, and 33 is connected to the LED driver 30. Thus, by radially disposing the plurality of first color LEDs 21 and the plurality of second color LEDs 22, color unevenness in the light emitting module 1 can be suppressed and crossing of the wirings and complicating of the circuit can be avoided.

Embodiment 2

Hereinafter, a lighting device according to Embodiment 2 of the present disclosure is described while referencing the drawings. The configuration and operations of the light emitting module 1 are the same as in Embodiment 1.

Lighting Device

Figure 10:
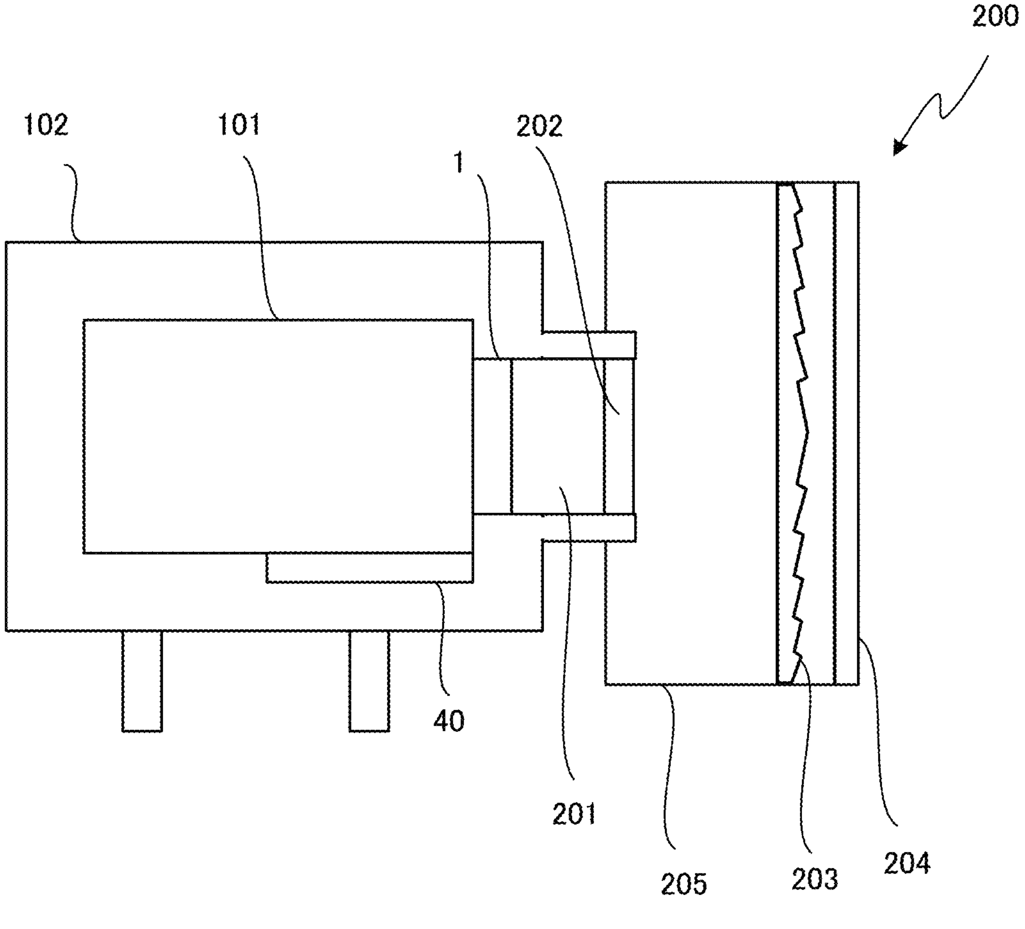
FIG. 10 is a configuration drawing of a spotlight lighting device to which a light emitting module of Embodiment 2 is applied.

A spotlight lighting device 200 that is a lighting device to which the light emitting module 1 of Embodiment 1 is applied is described. FIG. 10 is a configuration diagram of the spotlight lighting device 200 according to the present embodiment. The spotlight lighting device 200 includes a light emitting module 1, a heat dissipater (heat sink) 101, and a housing 102 that are the same as in Embodiment 1, and further includes a reflector 201, a diffusion plate 202, a lens 203, and a lens diffusion plate 204. Additionally, the spotlight lighting device 200 includes a non-illustrated power supply, and a control device 40 for controlling the correlated color temperature, the luminance, and the like of the emitted light.

The heat dissipater (heat sink) 101 radiates heat generated in the light emitting module 1 out of the spotlight lighting device 200. The light emitting module 1 is provided on one end of the heat dissipater 101. In one example, the heat dissipater 101 is formed from a plurality of heat dissipating plates including copper or the like, a heat pipe connected to the plurality of heat dissipating plates, and the like.

The housing 102 is a box-shaped member provided so as to cover the heat dissipater 101 and the light emitting module 1, and is supported by legs. A circular opening is provided on the light emitting module 1 side end of the housing 102. In one example, the housing 102 is formed from an aluminum alloy or the like.

The reflector 201 is positioned from the light emitting module 1 to the opening of the housing 102, and reflects and mixes the light emitted by the light emitting module 1. The reflector 201 has a cylindrical shape, and includes a reflecting surface on a cylinder-shaped inner wall thereof. Specifically, the reflecting surface extends in a direction perpendicular to the arrangement plane of the light emission elements (the LEDs 21 to 27) of the light emitting module 1. The reflecting surface of the reflector 201 is formed from a desired reflective material such as an aluminum reflective material or the like.

The diffusion plate 202 is installed on the opening of the housing 102, substantially parallel to the arrangement plane of the light emitting elements (the LEDs 21 to 27) of the light emitting module 1. Specifically, the diffusion plate 202 is positioned on the side of the reflector 201 opposite the light emitting module 1. The diffusion plate 202 scatters the light that the light emitting module 1 emits and that is reflected and mixed by the reflector 201 to eliminate inconsistencies in the light. The diffusion plate 202 has a disc shape and, in one example, is formed from an acrylic plate, polycarbonate, or the like.

The lens 203 is positioned on the side of the diffusion plate 202 opposite the light emitting module 1, and is installed substantially parallel to the diffusion plate 202, separated a predetermined distance from the diffusion plate 202. Specifically, the lens 203 is provided substantially parallel to the arrangement plane of the light emission elements (the LEDs 21 to 27) of the light emitting module 1. The lens 203 converges or diverges the light emitted from the light emitting module 1. In one example, the lens 103 is implemented as a Fresnel lens that has a sawtooth cross-section.

The lens diffusion plate 204 is used together with the lens 203 and, as a result, has a characteristic of diffusing/shaping the light that passes through the lens 203. An exit angle of the light that passes through the lens diffusion plate 204 can be restricted to within a predetermined range. In one example, the lens diffusion plate 204 is implemented as a light shaping diffuser (LSD). The lens diffusion plate 204 is disposed substantially parallel to the lens 203 and, preferably, is positioned on the side of the lens 203 opposite the light emitting module 1.

The characteristics of the lens 203 and the lens diffusion plate 204 are selected in accordance with required specifications including an illuminance or ½ illuminance angle of the spotlight lighting device 100. The lens 203 and the lens diffusion plate 204 are supported by a lens housing 205, and the lens housing 205 is fixed to the housing 102 of the light emitting module 1. The lens housing 205 may be detachable from the housing 102 or, alternatively, may be integrated with the housing 102.

The spotlight lighting device 200 configured as described above has higher illuminance and can suppress color separation more compared to a configuration in which the reflector 201, the diffusion plate 202, the lens 203, and the lens diffusion plate 204 are not provided. As such, it is possible to suppress the occurrence of a bluish ring that occurs around conventional spotlight lighting.

A configuration is possible in which the spotlight lighting device 200 includes the reflector 201 and the diffusion plate 202, and/or the lens 203 and the lens diffusion plate 204.

Note that a configuration is possible in which the spotlight lighting device 200 further includes a position adjustment mechanism for adjusting the position of the light emitting module 1 relative to the lens 203, a color filter for changing the color of the emitted light, and the like.

According to the spotlight lighting device 200 according to the present embodiment, the light emitting module 1 that has high color rendering is used as the light source and light is emitted with high efficiency and, as such, light closer to natural light can be emitted, and the spotlight lighting device 200 can be advantageously used in performance spaces such as stages and studios.

Note that, here, as the lighting device, an example is described in which the light emitting module 1 is applied to the spotlight lighting device 200. However, the lighting device is not limited to a spotlight and may be any device (for example, a light bulb or the like) that includes the light emitting module 1 described above.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2021-55101, filed on Mar. 29, 2021, the entire disclosure of which is incorporated by reference herein.

REFERENCE SIGNS LIST

1 Light emitting module
10 Substrate
21 to 27 LED
30 LED driver
31 to 33 Wiring
40 Control device
40*a* Storage
40*b* Processor
100, 200 Spotlight lighting device
101 Heat dissipater
102 Housing
201 Reflector
202 Diffusion plate
203 Lens
204 Lens diffusion plate
205 Lens housing

The invention claimed is:

1. A light emitting module comprising:

a first light source that emits light having a first correlated color temperature;

a second light source that emits light having a second correlated color temperature higher than the first correlated color temperature; and five types of colored light sources, each capable of emitting light having a different emission light color, wherein the first light source, the second light source, and the five types of colored light sources are each caused to emit light at a predetermined luminescence intensity ratio, thereby enabling emission of mixed light that has a correlated color temperature of 5000K to 6500K and in which a general color rendering index Ra is 98 or greater, a special color rendering index R9 is 98 or greater, and a special color rendering index R12 is 94 or greater.

2. The light emitting module according to claim 1, wherein the first correlated color temperature is 2700K.

3. The light emitting module according to claim 1, wherein the second correlated color temperature is 5700K.

4. The light emitting module according to claim 1, wherein the first light source is a light bulb-color light source and the second light source is a white light source, and the five types of colored light sources include a violet light source, a blue light source, a cyan light source, a lime light source, and a red light source.

5. The light emitting module according to claim 1, wherein the first light source, the second light source, and the five types of colored light sources each is caused to emit light at a predetermined luminescence intensity ratio, thereby enabling emission of mixed light that has a correlated color temperature of 5000K to 6500K and in which the general color rendering index Ra and the special color rendering index R9 are 99.

6. The light emitting module according to claim 4, wherein mixed light that has a correlated color temperature from 5000k to 6500k is emitted by causing each of the first light source, the second light source, and the lime light source to emit light at a sufficiently higher luminescence intensity than a total of the luminescence intensities of the five types of colored light sources, excluding the lime light source.

7. The light emitting module according to claim 1, further comprising:

a light modulation controller capable of modulating each of the first light source, the second light source, and the five types of colored light sources with predetermined steps of resolution, wherein the light modulation controller performs modulation by combining frequency modulation, pulse width modulation, and direct current modulation.

8. The light emitting module according to claim 1, wherein each of a plurality of the first light source and a plurality of the second light source is radially arranged in a direction from near a center of a circular substrate toward a circumference of the circular substrate.

9. A lighting device comprising:

the light emitting module according to claim 1.

10. The lighting device according to claim 9, further comprising:

a control device that controls the light modulation controller that modulates the first light source, the second light source, and the five types of colored light sources, wherein the control device includes a storage that stores, in advance, a table expressing relationships between a luminescence intensity of the first light source, the second light source, and the five types of colored light sources, and the correlated color temperature, references the table stored in the storage to determine the luminescence intensity of the first light source, the second light source, and the five types of colored light sources corresponding to the desired correlated color temperature, and controls, based on the determined luminescence intensity, the light modulation controller.

11. The lighting device according to claim 9, further comprising:

a reflector that includes a reflecting surface perpendicular to an arrangement plane of the first light source, the second light source, and the five types of colored light sources of the light emitting module, and that reflects light emitted by the light emitting module; and a diffusion plate that is provided on a side of the reflector opposite the light emitting module, and that diffuses light reflected by the reflector.

12. The lighting device according to claim 9, further comprising:

a lens that extends substantially parallel to an arrangement plane of the first light source, the second light source, and the five types of colored light sources of the light emitting module, and that converges or diverges light emitted by the light emitting module; and a lens diffusion plate that extends substantially parallel to the lens, and that diffuses/shapes light that passes through the lens.

13. The light emitting module according to claim 2, wherein the second correlated color temperature is 5700K.

14. The light emitting module according to claim 2, wherein the first light source is a light bulb-color light source and the second light source is a white light source, and the five types of colored light sources include a violet light source, a blue light source, a cyan light source, a lime light source, and a red light source.

15. The light emitting module according to claim 3, wherein the first light source is a light bulb-color light source and the second light source is a white light source, and the five types of colored light sources include a violet light source, a blue light source, a cyan light source, a lime light source, and a red light source.

16. The light emitting module according to claim 13, wherein the first light source is a light bulb-color light source and the second light source is a white light source, and the five types of colored light sources include a violet light source, a blue light source, a cyan light source, a lime light source, and a red light source.

17. The light emitting module according to claim 2, wherein the first light source, the second light source, and the five types of colored light sources each is caused to emit light at a predetermined luminescence intensity ratio, thereby enabling emission of mixed light that has a correlated color temperature of 5000K to 6500K and in which the general color rendering index Ra and the special color rendering index R9 are 99.

18. The light emitting module according to claim 3, wherein the first light source, the second light source, and the five types of colored light sources each is caused to emit light at a predetermined luminescence intensity ratio, thereby enabling emission of mixed light that has a correlated color temperature of 5000K to 6500K and in which the general color rendering index Ra and the special color rendering index R9 are 99.

19. The light emitting module according to claim 4, wherein the first light source, the second light source, and the five types of colored light sources each is caused to emit light at a predetermined luminescence intensity ratio, thereby enabling emission of mixed light that has a correlated color temperature of 5000K to 6500K and in which the general color rendering index Ra and the special color rendering index R9 are 99.

* * * * *